May 21, 1957     K. A. ANDERSON     2,792,707

DEVICE FOR USE IN DETERMINING TENSION IN FLEXIBLE SHEET MATERIAL

Filed Jan. 24, 1956

INVENTOR.
KINSEY A. ANDERSON

ATT'Y

United States Patent Office 2,792,707
Patented May 21, 1957

2,792,707

DEVICE FOR USE IN DETERMINING TENSION IN FLEXIBLE SHEET MATERIAL

Kinsey A. Anderson, Iowa City, Iowa, assignor, by mesne assignments, to the United States of America as represented by the Secretary of the Navy Application January 24, 1956, Serial No. 561,169

6 Claims. (Cl. 73—88)

This invention relates to the measurement of the surface tension or degree of tightness in materials such as sheets, films or fabrics, and is more particularly described as a device for measuring tension in three-dimensional objects formed of flexible fabrics, or film, such as polyethylene balloons where it is desirable to measure both tension components in biaxially stressed fabric materials.

It is no feature of this invention to measure the strength of a material or the transmission of forces to or by a material, but rather to measure the degree or comparison of tightness in a fabric, and it is distinctly undesirable to bring large forces to bear on the material.

An important object in carrying out this method of measuring tension stress in a fabric is to provide a device which may be removably applied to a fabric under tension in different positions depending on the directions of stress in the fabric.

A further object of this invention is to provide a tensiometer which is simple in construction, easily applied and removed, and easily adjusted to produce a periodic movement easily observed and counted.

Figure 1:
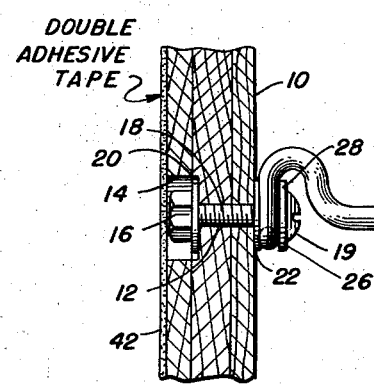
Figure 1:
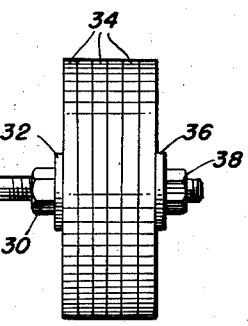
Figure 2:
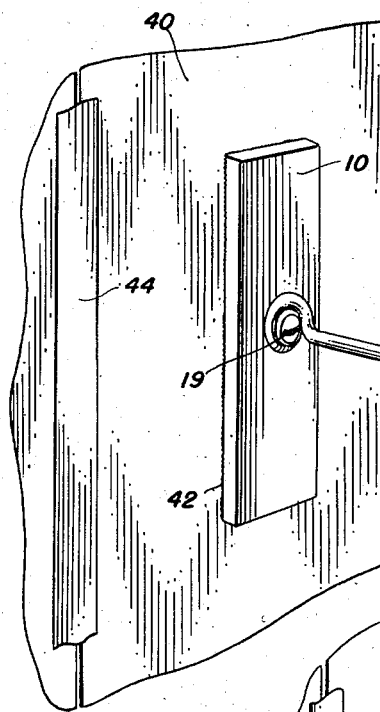
Figure 3:
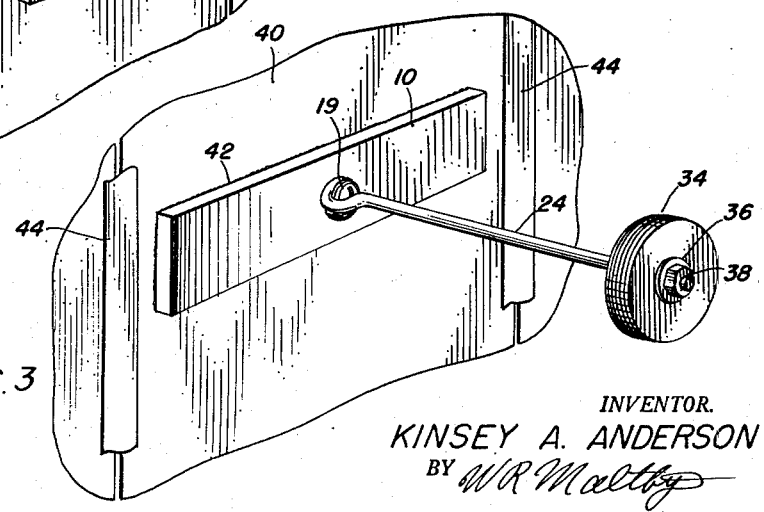

Other objects of the invention will appear in the specification and will be apparent from the accompanying drawings, in which Fig. 1 is a view partly in section showing a stress tensiometer in accordance with this invention;

Fig. 2 illustrates the stress tensiometer as applied to the surface of a portion of a balloon in vertical relation; and Fig. 3 illustrates the stress tensiometer as applied to a portion of the surface of the balloon in a horizontal relation.

Referring more particularly to the drawings, a suitable form of the tensiometer comprises a flat elongated mounting strip 10. The exact dimensions of this strip are not important, but for convenience in applying and using it, it may be approximately 1″ wide and about 7½ or 8″ long. It is preferably constructed of light, strong material, such as plywood ¼″ in thickness.

Extending through the mounting strip 10 is a hole 12 located centrally of the strip both longitudinally and transversely with a recess 14 at the rear side for seating a nut 16 for a screw 18 which is inserted through the strip and has a head 19 at the front face thereof. A washer 20 is applied between the nut 16 and the bottom of the recess 14; another washer 22 surrounds the screw against the front face of the mounting strip 10.

A member 24 preferably in the form of a stiff wire about 3/32″ in diameter and preferably of piano wire or some similar bar stock is formed with a loop 26 at one end adapted to receive the screw 18 therethrough and to be seated between the washer 22 and another washer 28 engaging the outer side of the loop against the inside of the head 19 of the screw. With this fastening construction, the member 24 may be firmly secured to the mounting strip 10.

At the outer end of the member 24, it is desirable to apply a more or less heavy weight depending upon the material to which the tensiometer is applied and the stress of fabric to be measured. For this purpose, the outer end of the member 24 is threaded for a considerable distance. An inner nut 30 is placed thereon with a washer 32 adjacent to it, a weight 34 in the form of a number of elements of lead, iron or other heavy material are placed thereon, a washer 36 is placed at the outer side of the weight, and a fastening nut 38 is threaded on the outer end of the member 24. With this construction the weight 34 may be varied by changing the number of the weight elements, and the period of oscillation may be changed by moving the entire weight assembly inwardly or outwardly.

The stress tensiometer may be applied to a surface 40 of a balloon by means of an adhesive tape 42 which is adhesive on both sides, that is, it will adhere to the rear or undersurface of the mounting strip 10 and the other side of the adhesive tape will adhere to the surface 40 of the balloon. As shown in Fig. 2, for use in determining the horizontal tension in the balloon material 40 at a selected level, the mounting strip 10 extends substantially parallel to the reinforcing tapes 44 which join adjacent gores of a balloon in a well-known manner. The balloon described is preferably of polyethylene material having reinforcing tapes which are thermoplastically applied. The gores may be joined in any suitable manner.

As shown in Fig. 3, the stress tensiometer strip 10 is applied to a balloon surface 40 at right angles to its location as shown in Fig. 2, for use in determining the tension at right angles to that noted above. The attachment of the mounting strip 10 to the balloon by means of a double adhesive tape 42 is not critical and cement or other material may be used, and, in some cases, the strip has been secured by tape overlapping at the ends or over the sides and secured to the adjacent surface of the balloon. The loop 26 of the member 24 is tightly secured by the fastening screw 12 to the mounting strip 10, and the tensiometer has a period of oscillation dependent on various factors which can readily be interpreted to quantatively indicate tension of the fabric or other material to which it is attached.

When a tensiometer is thus mounted on a suitable surface and the weight 34 is pulled to one side in a direction at right angles to the direction in which the strip 10 extends, let us say to the left in Fig. 2, the entire tensiometer moving as a unit, the stressed fabric to which the tensiometer is attached assumes a Z-shaped formation in the path of its tension and exerts a restoring force which increases as the displacement increases. If the weight 34 is suddenly released, this force will swing the tensiometer back, but the tensiometer does not stop at the neutral position; because of its momentum, the tensiometer swings over to the right until the restoring force exerted by the fabric stops the motion in that direction and drives the tensiometer to the left. The oscillation continues until air friction and drag of the fabric damp out the motion.

The amount of time required to make one complete cycle of the tensiometer depends very little on the amplitude of the swing. This time is called the period of oscillation and varies as the fabric tension per unit length in the direction at right angles to the length of the tensiometer strip 10. A theory treating the motion as simple harmonic motion has been worked out and a very straightforward relationship results. The period of oscillation depends on the fabric tension to be measured, the size of the mounting strip 10, the weight 34 and its adjustment, and the effective distance from the fabric to the center of mass of the weight. This distance may be measured directly or determined trigonometrically after the angle of dip of the tensiometer when at rest is measured.

This device may be set in motion by hand and timed with a stop watch, or, when convenient, it may be excited by magnetic forces supplied by audiofrequency currents passed through a solenoid. The actual weight used in any particular case is the one which gives an oscillation frequency which may be easily measured.

It would be easily possible to record the oscillation electronically or photographically if of very high frequency such as might be encountered in tightly stretched or stiff sheets, films, or fabrics to which the tensiometer is applied. The principle of this operation is to measure the degree of tightness in the fabric.

While a preferred construction and operation is described in some detail in this application, it should not be regarded as a restriction or limitation therein as many changes may be made in the construction and arrangement of the parts without departing from the spirit and scope of the invention.

I claim:

1. A device for use in measuring tension in a flexible sheet, said device comprising a tensiometer including a weight, a member attached at one end to said weight and having a loop at its other end and being straight from said weight to said loop, an elongated mounting comprising a stiff strip having a flat surface at right angles to the straight portion of said member and facing away from said weight, means including a fastener passing through and engaging said loop and projecting into said strip and attaching said loop firmly to said strip, and removable adhesive means on said strip surface for removably attaching said strip to a surface of the sheet in different positions depending in each case on the path of the tension to be measured.

2. A device for use in measuring tension in a flexible sheet, said device comprising a tensiometer including a weight comprising a plurality of washers, a member having a straight portion attached at one end of said member to said weight, means for adjustably clamping said washers in place, a mounting attached to the other end of said member, said mounting having a face at right angles to said portion and facing away from said weight, and means for attaching said face to a surface of the sheet in the path of tension.

3. A tensiometer for use on flexible sheet material such as inflated balloon envelope film, said tensiometer comprising a weight, an elongated stiff member having one end firmly attached to the weight, a stiff mounting having a flat surface facing away from said weight, means attaching said mounting to the other end of said member to support said member cantilever fashion from said mounting, and means for attaching said surface to a surface of the sheet material.

4. A tensiometer for use on flexible sheet material such as inflated balloon envelope film, said tensiometer comprising a weight, an elongated stiff member having one end firmly attached to the weight, a mounting having an elongated flat surface facing away from said weight, means attaching said mounting to the outer end of said member to support said member cantilever fashion from said mounting, and means comprising an adhesive on said surface and formed to detachably apply said surface to a surface of the sheet material in different positions depending on the direction of the tension to be determined.

5. A tensiometer comprising a rigid strip, a member fixed cantilever fashion at one end to said strip, said strip having a flat surface facing away from said member, a double adhesive tape adhesively attached to said surface and adapted to be adhesively attached to a surface of an element whose tension is to be determined, the other end portion of said member being threaded, a pair of nuts on said portion, and a weight about said portion and clamped adjustably thereon by said nuts.

6. A tensiometer comprising a rigid flat strip having a central opening therethrough and a recess in one side of said strip at one end of said opening, a screw passing through said opening, a nut engaging said screw and seated entirely in said recess, a stiff rod having at one end a loop at the other side of said strip, a pair of washers between which said loop is disposed, said loop and washers being parallel to said strip and surrounding said screw, the head of said screw engaging the outer washer and clamping the inner washer against said other side of said strip, with said rod normal to said strip, a double adhesive tape attached to the first-mentioned side of said strip and covering said screw and nut at that side, the end portion of said rod remote from said loop being threaded, a pair of nuts threaded on said rod portion, a pair of washers about said threaded portion and between said pair of nuts, and weight means about said rod and between the latter washers and adjustably clamped in place by said nuts.

References Cited in the file of this patent

UNITED STATES PATENTS

| 2,009,406 | Longley | July 30, 1935 |
| 2,014,688 | Marboux | Sept. 17, 1935 |
| 2,358,369 | Weaver | Sept. 19, 1944 |

FOREIGN PATENTS

| 390,894 | Great Britain | Apr. 20, 1933 |
| 802,479 | France | June 13, 1936 |
| 240,830 | Switzerland | Jan. 31, 1946 |